(12) United States Patent
Benisty et al.

(10) Patent No.: US 9,128,615 B2
(45) Date of Patent: Sep. 8, 2015

(54) STORAGE SYSTEMS THAT CREATE SNAPSHOT QUEUES

(71) Applicants: Shay Benisty, Beer Sheva (IL); Yan Dumchin, Beer Sheva (IL); Yair Baram, Metar (IL); Tal Sharifie, Lehavim (IL)

(72) Inventors: Shay Benisty, Beer Sheva (IL); Yan Dumchin, Beer Sheva (IL); Yair Baram, Metar (IL); Tal Sharifie, Lehavim (IL)

(73) Assignee: SanDisk Technologies Inc., Plano, TX (US)

( * ) Notice: Subject to any disclaimer, the term of this patent is extended or adjusted under 35 U.S.C. 154(b) by 293 days.

(21) Appl. No.: 13/895,086

(22) Filed: May 15, 2013

(65) Prior Publication Data
US 2014/0344536 A1    Nov. 20, 2014

(51) Int. Cl.
*G06F 3/06*    (2006.01)
*G06F 11/36*    (2006.01)

(52) U.S. Cl.
CPC ............... *G06F 3/06* (2013.01); *G06F 3/0659* (2013.01); *G06F 11/3664* (2013.01); *G06F 2201/84* (2013.01)

(58) Field of Classification Search
CPC ..... G06F 3/06; G06F 3/0695; G06F 11/3664; G06F 2201/84
See application file for complete search history.

(56) References Cited

U.S. PATENT DOCUMENTS

| 2004/0078544 | A1 | 4/2004 | Lee et al. |
| 2014/0337562 | A1* | 11/2014 | Long et al. ................... 711/103 |
| 2014/0337686 | A1* | 11/2014 | Baptist et al. ................. 714/763 |
| 2015/0081773 | A1* | 3/2015 | Ansel et al. ................... 709/203 |

FOREIGN PATENT DOCUMENTS

| DE | 10128752 A1 | 12/2002 |
| WO | WO 02/31660 A2 | 4/2002 |
| WO | WO 2009/003038 A2 | 12/2008 |

* cited by examiner

*Primary Examiner* — John Lane
(74) *Attorney, Agent, or Firm* — Brinks Gilson & Lione

(57) ABSTRACT

A storage system may include a queue included in a memory and a controller configured to store commands received from a host in the queue. The queue may have a linked-list configuration. In response to a triggering event, the controller may take a snapshot of the queue, creating a snapshot queue. The snapshot queue may have a linear configuration. Subsequent analysis or parsing of queued information may be performed on the linear snapshot queue instead of the linked-list queue. Modifications to the linear snapshot queue may be corresponding made to the linked-list queue.

24 Claims, 8 Drawing Sheets

STORAGE SYSTEMS THAT CREATE SNAPSHOT QUEUES

BACKGROUND

Storage systems may include a controller that handles commands received from a host. The controller may be configured to store the commands in a queue when the controller is unable to immediately execute the command. When the command is ready for execution, the controller may select the command from the queue. In some situations, such as firmware intervention or debugging, parsing or analyzing the queue may be performed to address the situation. Parsing or analyzing the queue as quickly and efficiently as possible may be desirable. At the same time, queues with enhanced modification, such as queues that allow for insertion or deletion of entries with relatively simple processing, may also be desirable.

SUMMARY

Embodiments of the present invention are defined by the claims, and nothing in this section should be taken as a limitation on those claims. By way of example, the embodiments described in this document and illustrated in the attached drawings generally relate to a storage system and related methods of creating a snapshot queue from a default queue, where one of the queues has a linked-list configuration and the other queue has a linear configuration.

In one example, a storage system includes a memory comprising a linked-list queue; and a controller configured to receive host commands from a host device; store at least one of the host commands or information from the at least one host command in the linked-list queue; and take a snapshot of the linked-list queue to create a linear snapshot queue, where the linear snapshot queue has a linear configuration.

In sum, a storage system may implement a queue system that has both readability features attributable to linear queues and modification features attributable to linked-list queues.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

The present description describes a storage system that may be configured to store commands received from a host in a queue. The queue may have a linked-list configuration in which the commands may be stored discontinuously and pointers may be used to determine the locations of the entries. In response to a triggering event, the storage system may create a snapshot of the queue. The snapshot may be configured to have a linear configuration in which the snapshot of the commands may be stored continuously. Subsequent queue operations related to the triggering event may be performed on the linear snapshot queue rather than the linked list queue. Any modifications to the linear snapshot queue may be correspondingly made to the linked-list queue. In this way, the storage system may implement a queue system using features of both linear queues and linked-list queues.

Figure 1:
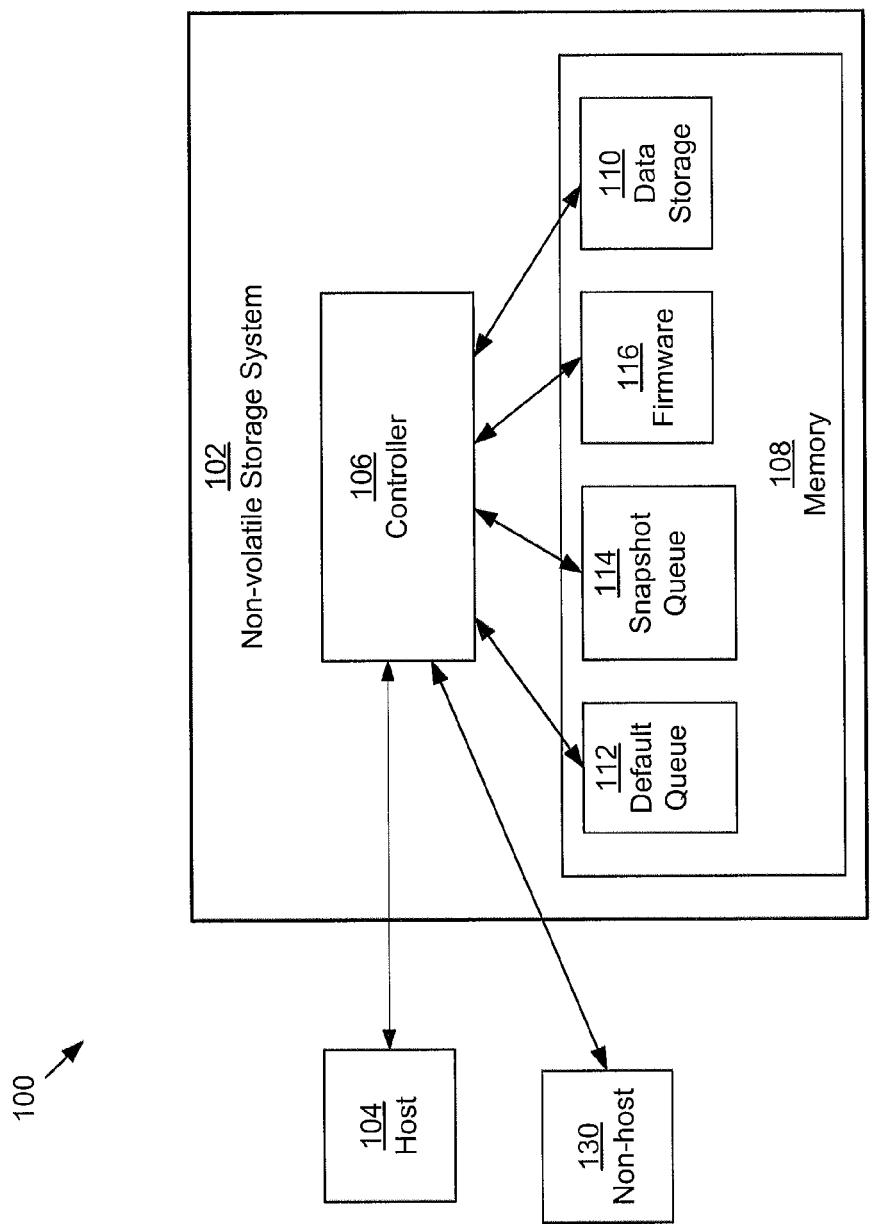
FIG. 1 is a block diagram of an example system that includes a storage system and a host.

FIG. 1 shows a block diagram of a system 100 that includes a storage system 102, which may be a non-volatile storage system, that is configured to store and manage the storage of data. The storage system 102 may be configured to communicate, either wirelessly or through a wire connection, with a host device or host 104 to perform data transfers with the storage system 102. The host 104 may be configured to send host commands to the storage system 102 for performing a function or operation indicated in the command. Example host commands may include a read host command to read data from the storage system 102 or a write host command to write data to the storage system 102. Other host commands may include administrative (admin) commands to control management of the data stored in the storage system 102 and/or the host commands themselves. For example, an admin command may include an abort commands to abort or stop another host command, such as a read command or a write command, from being executed. Other types of host commands are possible.

The storage system 102 may include a controller 106 that is configured to control and manage storage of the data in the storage system 102. The controller 106 may be configured to communicate with the host 104. For example, the controller 106 may be configured to receive the host commands from the host 104 and respond back to the host 104 when execution of a host command is complete. Also, the controller 104 may be configured to process and execute the host commands.

To process a host command, the controller 106 may be configured to perform one or more functions on the host command. The functions may be performed on the host command to prepare or format the host command for execution by the controller 106. As examples, the controller 106 may be configured to parse the host command to identify or analyze the information included in the host command. For example, the controller 106 may parse the host command to determine the type of the host command (e.g., whether the host command is a read command or a write command), or to determine the correctness of the information in the command (e.g., to check whether the host command includes an invalid address).

Additionally, the controller 106 may be configured to queue the host command. For some situations, the controller 106 may receive more host commands than the controller 106 is able to handle or execute, in which case the controller 106 may determine to queue at least one of the host commands until a later time at which the controller 106 is able to execute the command. The controller 106 may also be configured to arbitrate the host commands, in which the controller 106 may select a host command based on one or more predetermined criteria, such as priority, addressing, or an internal state of the storage system 102, as examples. In addition, the controller 106 may be configured to translate the host command into a format that the controller 106 may handle for execution. To illustrate, the host command may require transfer of data that is stored in two different areas, such as two different dies, in the storage system 102. Because the data is stored in two different areas, the controller 106 may translate the host command into two different data transfer commands so that all of the data stored in the two different areas may be transferred in order to complete the host command. Various other situations requiring translation may be possible. After at least some of these above-described functions are performed, the host command may be ready for execution by the controller 106.

The controller 106 may be implemented in hardware or a combination of hardware and software and/or firmware, either of which may include program instructions. For example, in some situations, the controller 106 may be configured to perform one or more of its functions using hardware logic and without executing program instructions. In alternative situations, the controller 106 may execute program instructions to perform its functions.

The storage system 102 may also include a memory 108. The memory 108 may include various parts or portions that may store different types of data or information that the controller 106 may use and/or access to manage and execute the host commands. For example, the memory 108 may include a data storage portion 110 that is configured to store data written or read by the host 104. The controller 106 may read data from and/or write data to the data storage 110 to execute read or write host commands. For some configurations, the data storage 110 may be configured or arranged to have a single or alternatively multiple different areas, such as a single die or multiple dies of silicon.

The storage system 102 may further include firmware 116 stored in the memory 108. The firmware 116 may include software and/or a set of program instructions. The controller 106 may perform one or more functions by executing the firmware 116. In this way, the firmware 116 may control the operation of the controller 106. For some situations, the controller 106 may perform a function or operation using its internal hardware logic and without executing the firmware 116. In alternative situations, the controller 106 may perform a function or operation using the firmware 116. Some functions or operations may always be performed without executing the firmware 116. Other functions or operations may be designating for the firmware 116 and thus may always be performed by executing the firmware 116. Still other function or operations may be performed by the controller 106 with or without executing the firmware 116. An example function may be queuing. In some situations, the controller 106 may perform queuing operations using its internal logic and without executing the firmware 116. In alternative situations, the controller 106 may use or execute the firmware 116 to perform the queuing operations. For these alternative situations, when the controller 106 is using or executing the firmware 116, the firmware 116 may be considered to be intervening in or controlling the operation or functioning of the controller 106.

In addition, the memory 108 may include a default queue portion 112. The controller 106 may be configured to perform queuing operations by queuing or storing in the default queue 112 host commands that the controller 106 is unable to immediately execute. The default queue 112 may be configured to store host commands or information included in the host commands for execution. Upon receipt of a host command, if the controller 106 is unable to immediately execute it, the controller 106 may store at least part of the host command in the default queue 112. For example, the controller 106 may store in the default queue 112 only information included in the host command relevant or important to the transfer (e.g., the reading or writing) of the data. Information important or relevant to the data transfer may include information identifying the type of the host command (e.g., whether the host command is a read or write command); an address, such as a base address, of the data being read or written; or a size of the data, as examples. Other information that may be important or relevant to the data transfer is possible.

In some example configurations, the default queue 112 may include multiple queues or queue channels. The multiple queue channels may be arranged based on predetermined criteria. As an example, the queue channels may be arranged based on the type of the host command. One queue channel may queue only write commands and another queue channel may queue only read commands. As another example, the queue channels may be arranged corresponding to different areas of the data storage 110. As an example, if the data storage 110 includes four areas, then the default queue 112 may include four queue channels, where each queue channel corresponds to one of the areas. Various arrangements or combinations of arrangements are possible.

The host commands or information from the host commands may be stored as entries in the default queue 112. The default queue 112 may be separated or divided into sections. A total number of sections may define or determine a maximum capacity or queue depth of the default queue 112. Each host command or information from the host command that is waiting for execution may be stored as an entry in one of the sections of the default queue 112. At any given time, a number of entries up to the total number of sections may be included in the queue 112. If a section does not include an entry, then that section may be considered or identified as being empty. Each section may have or be associated with a memory address of the default queue 112 (or the memory 108 generally). The memory addresses associated with each of the sections may be different from each other. Thus, each entry may be stored at a different memory address from other stored entries in the default queue 112.

The default queue 112 (or each of the queue channels of the default queue 112) may have a configuration that determines or defines a way in which entries in the default queue 112 are stored. Two configurations are described—a linear configuration and a linked-list configuration—although other queue configurations may be possible.

A first queue configuration may be a linear configuration. Example linear configurations may include first-in first-out (FIFO) or last-in first-out (LIFO) configurations. Queues having a linear configuration (or linear queues) may store entries continuously and in a sequential order based on a next available address or section in the queue. That is, for linear queues, entries are stored in sequential order and in such a way that there are no empty sections or available addresses in between two sections containing entries.

Figure 2:
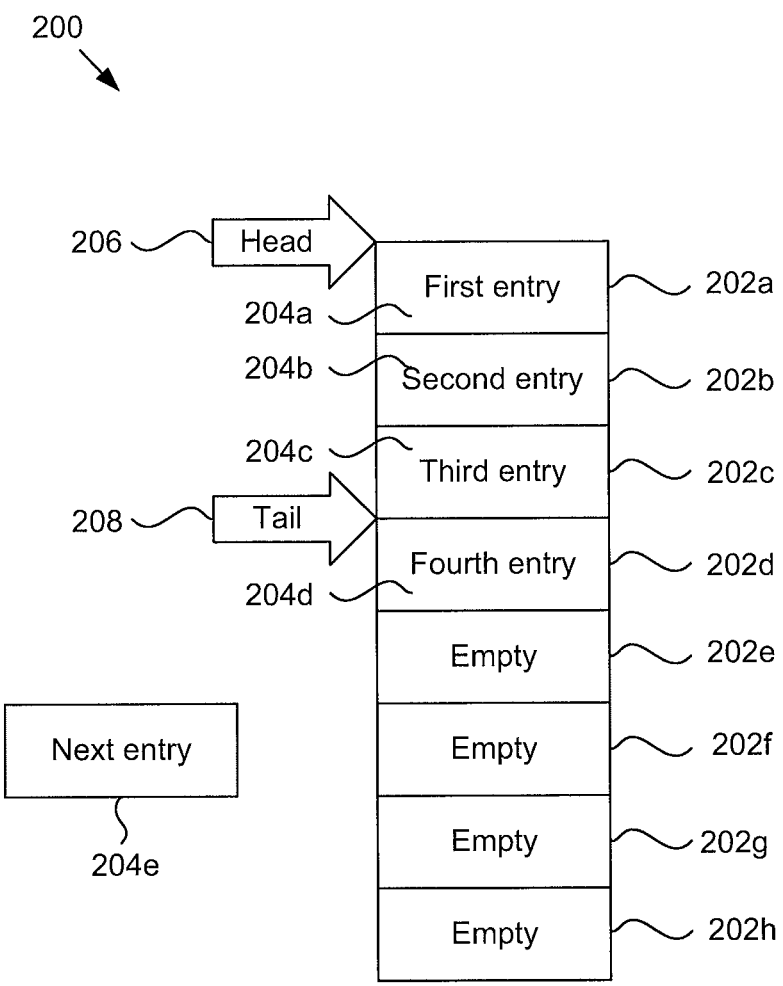
FIG. 2 is a block diagram of a structure of an example linear queue.

FIG. 2 shows a block diagram of a structure of an example linear queue 200. The example linear queue 200 is shown having eight sections 202a-h, although other numbers of sections 202 may be used. At any given time, up to eight entries may be included in the queue 200. The linear queue 200 may include or use two pointers, a head pointer 206 and a tail pointer 208. In general, a pointer may include an address of a next entry in the queue. For linear configurations, the linear queue 200 may include or use a head pointer 206 that points to a first address at which to store an initial entry and a tail pointer 208 that points to a last address at which a last entry is being stored. For the example linear queue 200 shown in FIG. 2, the head pointer 206 points to a first section 202a. As such, a first or initial entry stored in the example linear queue 200 is stored in the first section 202a, and any subsequent entries are stored continuously in next available sections 202b-202h. Alternative configurations of the linear queue 200 may configure the head pointer 206 to point to sections other than the first section 202a, such as sections 202b-202h. Subsequent entries following storage of the initial entry are then continuously stored in the next available entries. Additionally, if an entry is stored in a last section 202h of the linear queue 200, the next section may be the first section 202a. If an entry is stored in the last section 202h, a next entry would then be stored in the first section 202a, provided that the first section 202a is available (e.g., empty). To illustrate, if the head pointer 206 pointed to the last section 202h, then an initial entry would be stored in section 202h. Any subsequent entries would then be stored continuously in next available sections, which would be sections 202a-202g.

The example configuration of the linear queue 200 shown in FIG. 2 shows the head pointer 206 pointing to the first section 202a and four entries 204a-d occupying four of the sections 202a-d. In particular, a first entry 204a is stored in the first section 202a, a second entry 204b is stored in the second section 202b, a third entry 204c is stored in the third section 202c, and a fourth entry 204d is stored in the fourth section 202d.

The order in which the entries 204 are stored may be indicative of the order in which their corresponding host commands were received. Also, for linear queues, the head and tail pointers 206, 208 may be used to insert new entries into the linear queue 200 and remove stored entries from the linear queue 200. In general, new entries may be stored at the tail section or the next available section of the linear queue 200, as indicated by the tail pointer 208. To illustrate, FIG. 2 shows a next entry 204e to be stored in the queue 200. In accordance with the linear configuration, the next entry 204e is to be stored in the fifth section 202e because that is the next available section in the linear queue 200, which may be indicated by the tail pointer 208 pointing to the fourth section 202d. Subsequently, when the next entry 204e is stored in the fifth section 202e (i.e., the next available section) of the linear queue 200, then the tail pointer 208 will include the memory address associated with the fifth section 202e. Also, entries stored in the linear queue 200 may be removed when they are located at the head, as indicated by the head pointer 206. For the configuration shown in FIG. 2, the first entry 204a is the entry to be removed because that is the entry stored at the head of the linear queue 200, as indicated by the head pointer 206.

For linear queues, removal of entries other than the entry stored at the head may be difficult, if not impossible.

A second queue configuration that the default queue 112 may have is a linked-list configuration. Queues having a linked-list configuration (or linked-list queues) may store entries discontinuously. That is, for linked-list queues, a next entry stored in the queue may be stored in a section having a memory address that is not the next available memory address in the queue. In this way, there may be a disconnect or discontinuity in memory addresses between two or more sections containing entries. To implement a linked-list queue, each entry may include two portions, a data portion and a pointer portion. The data portion may include the information from the host command. The pointer portion may include a pointer that includes a memory address at which the next entry is being stored in the linked-list queue. Because the next entry in the linked-list queue may not be continuously stored in the next section, the pointer portion may be needed to locate or determine the next entry. This configuration may be contrasted from the linear configuration, which may not include or need a pointer portion. Instead, for linear queues, the next entry may be located or determined without a pointer due to the next entry being continuously stored in the next section.

Figure 3:
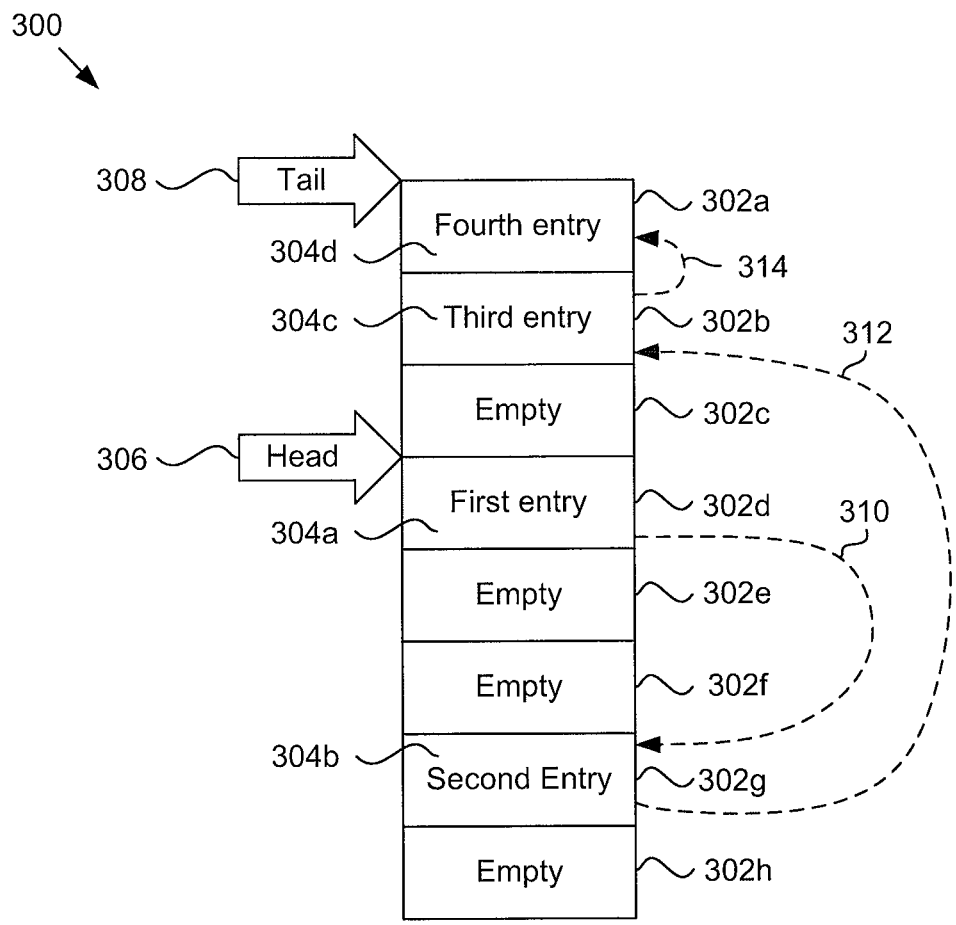
FIG. 3 is a block diagram of a structure of an example linked-list queue.

FIG. 3 shows a block diagram of a structure of an example linked-list queue 300. Similar to the linear queue 200, the linked-list queue 300 is shown having eight sections 302a-h, although other numbers of sections 302 may be included. In addition, similar to the linear queue 200, the linked-list queue 300 shows four entries 304a-d being stored in four sections 302. However, in contrast to the entries 204a-d being continuously stored in the linear queue 200, the entries 304a-d being stored in the linked-list queue 300 may be stored discontinuously in the sections 302. As shown in FIG. 3, the first entry 304a is stored in the fourth section 302d, the second entry 304b is stored in the seventh section 302g, the third entry 304c is stored in the second section 302b, and the fourth entry 304d is stored in the first section 302a.

Figure 4:
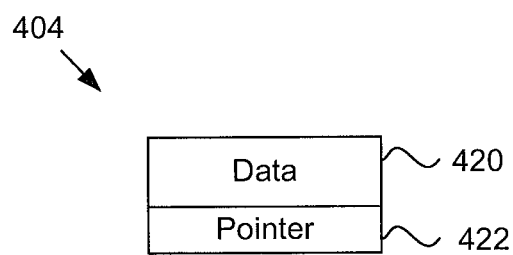
FIG. 4 is a block diagram a structure of an example entry in a linked-list queue.

To implement the linked-list queue 300, each of the entries 304 may include a data portion and a pointer portion, as previously described. FIG. 4 shows a block diagram of an entry 404 for a linked-list queue, which may be representative of the entries 304a-d being stored in the linked-list queue 300. As shown in FIG. 4, the entry 404 may include a data portion 420 and a pointer portion 422. The data portion 420 may include the information from the host command, and the pointer portion 422 may include the address at which the next entry is being stored in the linked-list queue.

Referring back to FIG. 3, dotted arrows 310-314 are included to denote the pointer portions of the entries pointing to the next entry in the linked-list queue 300. In particular, dotted arrow 310 denotes the pointer section of the first entry 304a pointing to the second entry 304b being stored in the seventh section 302g, dotted arrow 312 denotes the pointer section of the second entry 304b pointing to the third entry 304c being stored in the second section 302b, and dotted arrow 314 denotes the pointer section of the third entry 304c pointing to the fourth entry 304d being stored in the first section 302a. Also, as shown in FIG. 3, the linked-list queue 300 may include head and tail pointers 306, 308. Similar to the head and tail pointers 206, 208 for the linear queue, the head pointer 306 may include the address at which the first entry 304a is being stored, and the tail pointer 308 may include the last address at which the fourth entry 304d (i.e., the last entry) is being stored.

Linear queues and linked-list queues may have advantages and disadvantages over each other. For example, linear queues may have better readability or visibility than linked-list queues. Readability or visibility may refer to the ability to read or analyze information in the entries in the queue and/or the efficiency at which the entries may be read or analyzed. Because entries are stored continuously in the linear queue, thus eliminating a need for entries to have pointer portions pointing to next entries, linear queues may be read or analyzed more quickly and efficiently. Better queue readability may be desirable for certain applications or situations, such as debug or firmware intervention, as described in more detail below.

Although readability may be an advantageous feature of linear queues, modification of linear queues, including insertion or removal of entries in the linear queues, may be difficult, unfeasible, limited, and/or may require several steps or operations, particularly for entries located in sections of the linear queue other than the head or tail. In contrast, linked-list queues may have worse readability or visibility than linear queues because linked-list queues allow for discontinuous storage of entries and thus need pointers. However, linked-list queues may be easier to modify than linear queues because the pointer portions may be utilized to facilitate insertion and removal of the entries. As a result, linked-list queues may better for implementation of certain features or functionality. For example, linked-list queues may be preferable over linear queues for use of a priority scheme because linked-list queues may select higher-priority commands for execution without those commands being at the head of the queue, whereas linear queues may be limited to selecting only those commands at the head. As another example, linked-list queues may better implement abort functionality where commands may be aborted prior to commencement of their execution because linked-list queues may remove commands from the queues regardless of their order, whereas linear queues may be unable to remove commands that are not at the head of the linear queue. Various other advantages and disadvantages between linear and linked-list queues may be possible.

Referring back to FIG. 1, the default queue 112 may have either a linear configuration or a linked-list configuration. The memory 108 may further include a snapshot (or dump) queue portion 114 having a queue configuration that is opposite from the queue configuration that the default queue 112 has. For example, where the default queue 112 has a linear configuration, then the snapshot queue 114 may have a linked-list configuration. Similarly, where the default queue 112 has a linked-list configuration, then the snapshot queue 114 may have a linear configuration 112.

The snapshot queue 114 may be a snapshot or copy of the default queue 112 by having a queue state that matches a queue state of the default queue 112 for a given point in time. The queue state of a queue may identify the entries in the queue and an order in which the entries are stored in the queue. However, the queue state may not refer to the queue configuration of the queue. That is, the queue state may not refer to the positioning in the sections of the queue, the addresses at which the entries are stored in the queue, or whether the entries are stored continuously or discontinuously. In this way, the snapshot queue 114 may have a queue state that matches the queue state of the default queue 112 at a given point in time even if the default and snapshot queues 112, 114 have different queue configurations, provided that, at the time the snapshot or copy is taken, the snapshot queue 114 stores the same entries that are stored in the default queue 112, and stores the entries in the same order as the order in which the entries are stored in the default queue 112.

Referring back to FIGS. 2 and 3, the example linear queue 200 and the example linked-list queue 300 may be snapshots of each other, assuming that the first, second, third, and fourth entries are the same, and even though the queues 200 and 300 have different queue configurations. The queues 200 and 300 both store the same four entries, and the order in which the four entries are stored are the same. The order is the same because in the linked-list queue 300, the first entry 304a points to the second entry 304b, which points to the third entry 304c, which points to the fourth entry 304d. If the pointers in the linked-list queue 300 pointed differently, then the orders in which the entries are stored in the two queues 200, 300 may not be the same. Also, the maximum capacity or queue depth (e.g, a total number of sections) of the queues 200, 300 do not necessarily have to be the same for the queues 200, 300 to be snapshots of each other. For example, as shown in FIGS. 2 and 3, each of the queues 200, 300 have eight sections, with four of the sections being empty. However, if in an alternative configuration, the queue 200 had a different number of sections (e.g., no empty sections), the queues 200, 300 may still be snapshots of each other because queues 200, 300 store the same four entries in the same order.

The controller 106 may be configured to create the snapshot queue 114 by taking a snapshot of the default queue 112. The following description hereafter describes an example configuration of the storage system 102 where the default queue 112 has a linked-list configuration, and the controller 106 takes a snapshot of the default queue 112 to create the snapshot queue 114 having a linear configuration. However, for alternative example configurations, the default queue 112 may have a linear configuration, and when the controller 106 takes a snapshot, the controller 112 creates the snapshot queue 114 having a linked-list configuration.

To create the snapshot queue 114, the controller 106 may be configured to determine a maximum capacity or a total number of sections for the snapshot queue 114. To do so, the controller 106 may analyze the structure of the default queue 112 to determine the properties and content of the snapshot queue 114. For example, the controller 106 may determine a maximum capacity or number of sections for the snapshot queue 114 by identifying the number of sections and/or the number of entries included in the default queue 112. Using the linked-list queue 300 shown in FIG. 3 as an example, the controller 106 may identify that the default queue 112 has eight sections, and determine to set a corresponding eight sections for the snapshot queue 114. Alternatively, the controller 106 may determine that there are four entries in the default queue 112, and determine to set a total number of sections (e.g., maximum capacity or queue depth) based on the four entries for the snapshot queue 114. In some example configurations, the maximum capacity or total number of sections for the snapshot queue 114 may be equal to the number entries in the default queue 112. In this way, the snapshot queue 114 may not include empty sections. Alternatively, the maximum capacity or total number of sections for the snapshot queue 114 may be greater than the number of entries in the default queue 112. That is, the snapshot queue 114 may include one or more empty sections. The number of empty sections may be determined from a number of empty sections included in the default queue 112 at the time snapshot queue 114 is created. Alternatively, the number of empty sections may be determined independent of the number of empty sections in the default queue 112. By including empty sections, one or more new entries may be inserted or added to the snapshot queue 114, such as through firmware intervention, after the snapshot queue 114 is created. For some example configurations, the controller 106 may determine the maximum capacity or set the total number of sections for the snapshot queue 114 based on valid entries, as opposed to entries generally, in the default queue 112, as explained in further detail below.

For some example configurations, when identifying the entries in the default queue 112, the controller 106 may distinguish between valid and invalid entries in the default queue 112. A valid entry may be an entry that should be in the default queue 112. Conversely, an invalid entry may be an entry that should not be in the default queue 112. For some example configurations, the controller 106 may operate under the assumption that all entries in the default queue 112 are valid. In alternative configurations, the controller 106 may analyze a validity field in each entry, which may indicate whether the entry is valid. If the entry is valid, then the controller 106 may determine to include the entry in the snapshot queue 114. If the entry is invalid, then the controller 106 may determine not to include the entry in the snapshot queue 114. The controller 106 may further take action to remove the invalid entry from the default queue 112. The controller 106 may then set the number of sections and/or the maximum capacity of the snapshot queue 114 based on the number of valid entries in the default queue 112.

Figure 5:
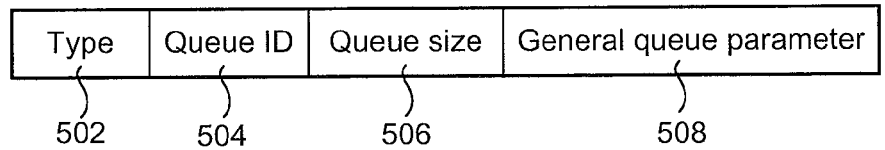
FIG. 5 is a block diagram of an example header line for a header of a snapshot queue.

The controller 106 may further be configured to create a header or header line for the snapshot queue 114. FIG. 5 shows a block diagram of an example header 500 for the snapshot queue. The header 500 may include a type field 502 that indicates that the header 500 is a header line of the snapshot queue 114, as opposed to an entry line of the snapshot queue 114. The type field 502 may include a value, such as a binary value having a logic "1" or "0" or a flag, that indicates that the header 500 is a header line and not an entry line.

The header 500 may also have a queue identification field 504 that includes a queue identifier (ID) that uniquely identifies the snapshot queue 114. The queue ID may be used where the default queue 112 includes multiple queues or multiple queue channels, as previously described. Where multiple queues or queue channels are used, creation of the snapshot queue 114 may include creation of a snapshot of each of the multiple queues or queue channels. The queue ID may be a unique identifier for each of the multiple snapshot queues or queue channels, and may be used to identify and/or differentiate between the multiple snapshot queues or queue channels. For example configurations that use only a single default queue 112, the queue ID may be an initial or default identifier. Alternatively, the queue identification field 504 including the queue ID may not be included in the header 500 where a snapshot of only a single queue or queue channel is created.

The header 500 may further include a queue size field 506 that indicates a size of the queue. The queue size may correspond to the number of entries to be included in the snapshot queue 114. The queue size may also include or factor a size of the header 500. The queue size field 506 may be included to enable or allow parsing of the snapshot queue 114. Alternatively, the queue size field 506 may indicate a maximum capacity or queue depth of the snapshot queue 114, or some combination of the maximum capacity and the number of entries (e.g, queue size) included in the snapshot queue 114.

In addition, the header 500 may include a general queue parameter field 508. The general queue parameter field 508 may include information that is general to or that generally describes the snapshot queue 114. For example, as previously described, the default queue 112 may include a plurality of queue channels that are arranged based on a predetermined criterion, such as the type of the host command or different areas of the data storage 110. The general queue parameter field 508 may include information identifying the predetermined criterion. Other information may be included.

Figure 6:
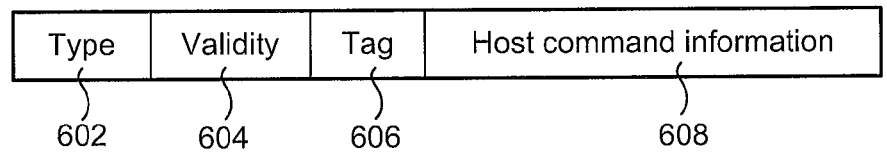
FIG. 6 is a block diagram of an example line entry of a snapshot queue.

The controller 106 may further be configured to create an entry or entry line for each of the entries to be included in the snapshot queue 114. Each entry of entry line in the snapshot queue may correspond to an entry (e.g., a valid entry) in the default queue 112. FIG. 6 shows an entry or entry line 600 that may be representative of each entry included in the snapshot queue. The entry 600 may include a type field 602 that indicates that the entry 600 is an entry or entry line of the snapshot queue 114, as opposed to the header or header line of the snapshot queue 114. The type field 602 may include a value, such as a binary value having a logic "1" or "0" or a flag, that indicates that the entry 500 is an entry line and not a header line.

The entry 600 may further include a validity field 604 that indicates whether the entry is valid or invalid. The validity field 604 may include a value, such as a binary value having a logic "1" or "0" or a flag, that indicates whether the entry 600 is valid or invalid. Initially, the controller 106 may set the validity field 604 for each entry 600 to be valid. Subsequent processing on or analysis of the snapshot queue 114 may determine that one or more of the entries should be removed from the snapshot queue 114. For these entries that should be removed, the validity field 604 may be changed to indicate that the entry is invalid. Upon identification of the change in the validity field 604, the controller 106 may be configured to remove or delete the corresponding entry in the default queue 112 and adjust the pointers for the linked-list configuration in the default queue 112 accordingly.

The entry 600 may further include a tag field 606 that includes a tag ID that identifies, such as uniquely identifies, a host command. The tag field 606 may be an optional field, and may depend on whether or not the storage system 102 uses tag IDs to identify the host commands.

The entry 600 may further include a host command information field 608 that includes the host command or information from the host command. For example, the host command information field 608 may include information from the host command that is important or relevant to execution of the host command. The information in the host command information field 608 may include or match the information from the host command that the controller 106 determined to include in the default queue 112 following parsing of the host command. As an example, a host command may have included transfer size information indicating a size of data to be transferred upon execution of the host command. Upon receipt of the host command, the controller 106 may include the transfer size information in a corresponding entry in the default queue 112. Upon creation of the snapshot queue 114, the transfer size information from the default queue 112 may be included in the host command information field 608 of a corresponding entry of the snapshot queue 114. Information other than transfer size information may be included in the host command information field 608.

The controller 106 may be configured to create or build the snapshot queue 114 in accordance with the linear configuration. As such, when creating the snapshot queue 114, the controller 106 may store the entries in the snapshot queue 114 continuously and in a sequential order. To determine the order, the controller 106 may use the pointers or pointer portions of the default queue 112 used for the linked-list configuration.

Figure 7:
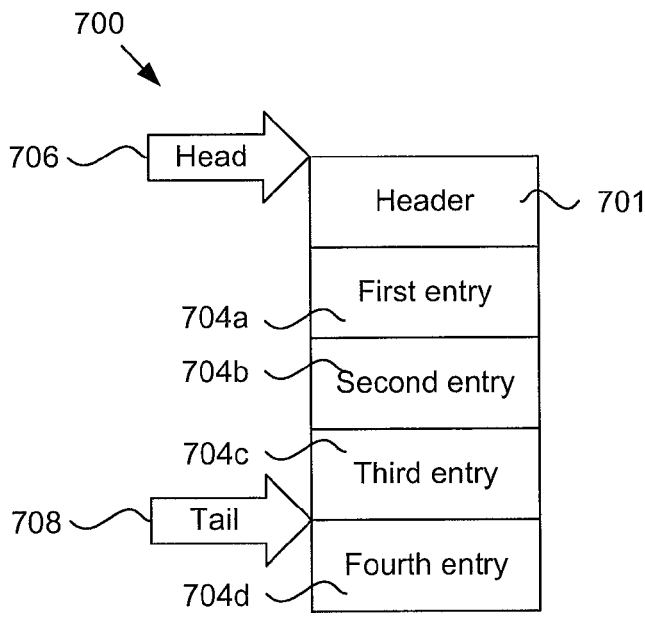
FIG. 7 is a block diagram of an example snapshot queue having a linear configuration.

FIG. 7 shows a block diagram of a structure of an example snapshot queue 700 having a linear configuration that may be representative of a snapshot queue of the linked-list queue 300 shown in FIG. 3. As shown in FIG. 7, the snapshot queue 700 may include a header 701, which may include the header fields and information, as previously described with reference to FIG. 5. In addition to the header 701, the snapshot queue 700 may include entries or entry lines 704a-d that correspond to the entries 304a-d included in the linked-list queue 300. The entries 704a-d may be stored continuously and in a sequential order in the snapshot queue 700.

The controller 106 may use the pointers and pointer portions of the entries 304 so that the order of the entries in the snapshot queue 700 matches the order of the entries in the linked-list queue 300. For example, referring to both FIGS. 3 and 7, the controller 106 may use the head pointer 306 to identify the first entry 304a. The controller 106 may create a first entry line 704a in the snapshot queue 700 that corresponds to and includes the information in the first entry 304a. The controller 106 may also use the pointer portion (e.g., dotted line 310) to identify the second entry 304b. The controller 106 may create a second entry line 704b in the snapshot queue 700 that corresponds to and includes the information in the second entry 304b. The controller 106 may further use the pointer portion (e.g., dotted line 312) to identify the third entry 304c and create a corresponding third entry line 704c, and may use the pointer portion (e.g., dotted line 314) to identify the fourth entry 304d and create a corresponding fourth entry line 704d. Lastly, the controller 106 may use the tail pointer 308 to identify the last entry of the linked-list queue 300.

Because the snapshot queue 700 has a linear configuration, the entries 704a-d may not include pointer portions pointing to the address at which the next entry is stored. However, the snapshot queue 700 may include or utilize head and tail pointers 706, 708 pointing to first and last locations of the snapshot queue 700. As shown in FIG. 7, the head pointer 706 may include an address in which the header 701 is stored, rather than the first entry 704a. The address identified by the head pointer 706 may be a base address for the snapshot queue 700. In alternative configurations, the tail pointer 708 may not be included or utilized by the snapshot queue 700. The tail pointer 708 may not be needed because the head pointer 706 along with the queue size identified in the header 701 may be sufficient to parse and/or analyze the snapshot queue 700.

Figure 8:
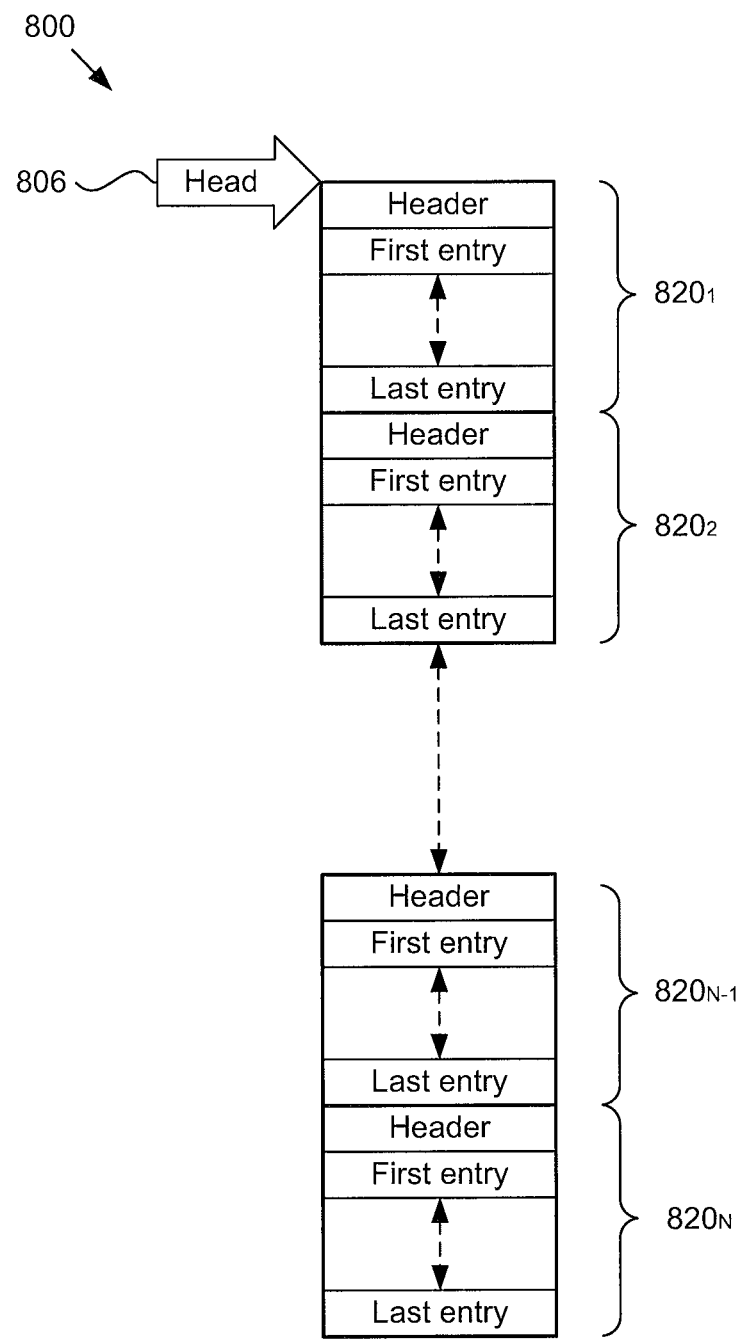
FIG. 8 is a block diagram of a structure of an example linear snapshot queue with multiple sections corresponding to multiple queue channels of a default queue.

FIG. 8 shows a block diagram of a structure of an example snapshot queue 800 having a linear configuration that may be a snapshot of a default queue having an N-number of multiple queues or queue channels, where N may be any number greater than or equal to 2. The example snapshot queue 800 may include an N-number of queue portions $820_1$ to $820_N$ corresponding to the N-number of queue channels. Each of the queue portions $820_1$ to $820_N$ may be a snapshot queue of one of the N-number of queue channels. As shown in FIG. 8, each of the queue portions $820_1$ to $820_N$ may have an associated header. In addition, each of the queue portions $820_1$ to $820_N$ may include one or more entries that correspond to one or more entries in the queue channels to which the queue portions $820_1$ to $820_N$ correspond.

As shown in FIG. 8, the multiple queue portions $820_1$ to $820_N$ may be configured in accordance with the linear configuration. In addition to each of the header and entries of a single queue portion being stored linearly, the queue portions $820_1$ to $820_N$ may be stored linearly relative to each other. That is, a header of a next queue portion may be stored continuously with a last entry of the previous queue portion. For example, as shown in FIG. 8, the header of the second queue portion $820_2$ may be stored continuously with a last entry of the first queue portion $820_1$. Similarly, the header of the last queue portion $820_N$ may be stored continuously with the last entry of the next to last queue portion $820_{N-1}$. The last entry of the previous queue portion stored continuously with a header of a next queue portion may be either a valid entry or an invalid entry. For example, when the snapshot queue 800 is created, the entries for each of the queue portions $820_1$ to $820_N$ may all be valid. Thereafter, the firmware may intervene to change one or more of the entries from being valid to invalid. If an entry being changed from valid to invalid is a last entry, then this last invalid entry may be stored continuously with a header of a next queue portion.

Figure 8A:
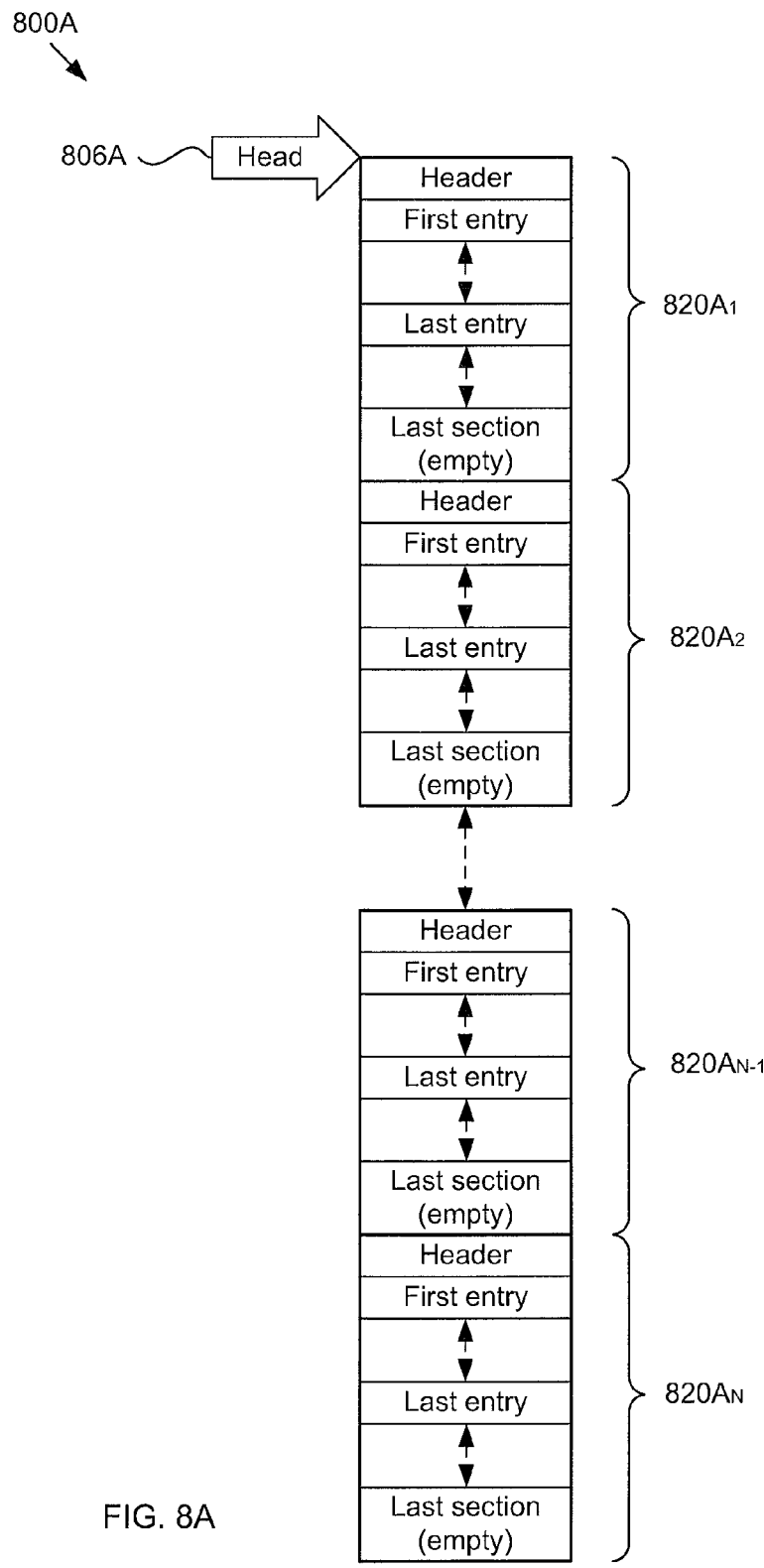
FIG. 8A is a block diagram of a structure of an alternative example linear snapshot queue with multiple sections corresponding to multiple queue channels of a default queue.

In alternative example configurations of a snapshot queue having multiple queue portions corresponding to multiple queue channels, a header of a next queue portion may be stored continuously with an empty section of a previous queue portion. To illustrate, FIG. 8A shows a block diagram of a structure of an alternative snapshot queue 800A having a linear configuration that may be a snapshot queue of a default queue having an N-number of multiple queues or queue channels. Like the example snapshot queue 800, the example snapshot queue 800A may include an N-number of queue portions $820A_1$ to $820A_N$ corresponding to the N-number of queue channels, where each of the queue portions $820A_1$ to $820A_N$ may be a snapshot queue of one of the N-number of queue channels. Also, each of the queue portions $820A_1$ to $820A_N$ may include one or more entries that correspond to one or more entries in the queue channels.

However, in contrast to the example snapshot queue 800, one or more of the queue portions $820A_1$ to $820A_N$ in the snapshot queue 800A may include an M-number of queue sections, where M may be a number that is greater than the number of entries being stored in the corresponding queue channel. Each queue section may include a valid entry, an invalid entry, or not include an entry (i.e., the queue section may be empty). In this way, the queue portions $820A_1$ to $820A_N$ may have a maximum capacity or depth that is greater than the queue size or number of entries being stored in the corresponding default queue channel. With a greater maximum capacity, there may be one or more empty queue sections in between a last entry stored in a previous queue portion and a header of a next queue portion. As such, when the snapshot queue is created, the last entry of a previous queue portion and header of a next queue portion may not be stored continuously. By including empty queue sections in the snapshot queue portions $820A_1$ to $820A_N$, the firmware may be able to insert new entries into the queue portions $820A_1$ to $820A_N$ after the snapshot queue 800A is created. Corresponding changes may then be made to the default queue when the firmware is finished intervening.

Various information may be used by the controller 106 to determine an order of the queue sections $820_1$ to $802_N$, such as the queue IDs or the general queue parameter information, as examples. Also, as shown in FIG. 8, the snapshot queue 800 may include a head pointer 806, which may be a base address for the snapshot queue 800 and/or include an address of the header of the first section $820_1$.

Referring back to FIG. 1, for some example configurations, the controller 106 may be configured to create the snapshot queue 114 automatically. That is, whenever the controller 106 updates the default queue 112 in the linked-list configuration 114, the controller 106 may also create and/or update the snapshot queue 114 having the linear configuration. In alternative example configurations, the controller may be configured to create the snapshot queue 114 in response to a triggering event. That is, the controller 106 may store received host commands in the default queue 112 and manage the default queue 112 without taking a snapshot, until the controller 106 detects or identifies the triggering event. Upon detection of the triggering event, the controller 106 may create the snapshot queue 114.

The triggering event may be any event detected or identified by the controller 106 in which reading, parsing, or analysis of the default queue 112 may be required, requested, or desired. An example triggering event may be a firmware event or situation that causes the controller 106 to use the firmware 116 to perform queuing operations, such as parsing or analyzing the default queue 112. For example, the controller 106 may identify or detect an error situation or scenario and determine that the error scenario may be corrected using the firmware 116 to perform queue operations (or that the error scenario may not be corrected without intervention by the firmware 116). Situations other than error situations may be detected and cause the controller 116 to use the firmware 116 to performing queuing operations.

Additionally, the controller 106 may detect the firmware event in various ways. For example, the controller 106 may detect an internal hardware event, which may identify an error. The controller 106 may be configured to provide information about the internal hardware event to the firmware 116 when using the firmware 116 to perform the queuing operations. As another example, the controller 106 may determine to perform queuing operations using the firmware 116 through execution of the firmware 116 itself. In this way, the firmware 116 may be considered to provide a firmware request to intervene in the queuing operations. In another example, the controller 106 may receive instructions or commands from an external source, such as the host 104, which may request or instruct the controller 106 to use the firmware 116 to perform queuing operations.

In response to the triggering event, the controller 106 may create the snapshot queue 114. Subsequent queuing operations may then be performed on the snapshot queue 114. For example, if the triggering event is an event that causes the controller to use the firmware 116 to perform queuing operations, then after the snapshot queue 114 is created, the controller 106 may use the firmware 116 to analyze or parse the snapshot queue 114.

In some situations, the controller 106, such as by using the firmware 114, may determine to modify the snapshot queue 114. For example, the controller 106 using the firmware 114 may determine to remove an entry in the snapshot queue 114 in order to correct an error scenario. To have the entry removed, the controller 106, using the firmware 116, may modify or manipulate information in the snapshot queue 114. For example, a validity field in the entry to be removed may be modified to indicate that the entry is an invalid entry. Other types of modification or manipulation may be possible. As another example of modifying the snapshot queue 114, the controller 106, such as by using the firmware 114, may add one or more new entries in one or more empty sections of the snapshot queue 114.

After the controller 106 is finished using the firmware 116 to analyze the snapshot queue 114 and perform any modifications on the snapshot queue 114, the controller 106 may be configured perform modifications on the default queue 112 that correspond to modifications made to the snapshot queue 114. For example, if a particular entry in the snapshot queue 114 was changed to being an invalid entry, then the controller 106 may remove the corresponding entry in the default queue 112. Similarly, if a new entry is added to the snapshot queue, then the controller 106 may add a similar new entry in the default queue 112.

For some example configurations, the controller 106 may be configured to use the firmware 116 only for queue operations performed on the snapshot queue 114 after the snapshot queue 114 is created. For example, the controller 106 may use the firmware 116 to analyze or parse the snapshot queue 114 and/or to perform modifications to the snapshot queue 114. Otherwise, the controller 106 may be configured to perform queuing operations using its hardware logic without using the firmware 116. For example, the controller 106 may receive host commands, store the host commands in the default queue 112, and create the snapshot queue 114 using its hardware logic without using the firmware 116. In addition, after the controller 106 is finished using the firmware 116 to perform operations on the snapshot queue 114, the controller 106 may perform subsequent updates to the default queue 112 using the hardware logic and without using the firmware 116. Other configurations may be possible.

In addition or alternatively to triggering events involving the firmware 116, another example triggering event may be a debug event that indicates to the controller 106 that an external device, such as the host 104 or a non-host device 130 (e.g., a logic analyzer or a logic exerciser) wants to debug the storage system 102, which may include an analysis and/or parsing of queued information. In response to the debug event, the controller 106 may create the snapshot queue 114. Any debugging that involves an analysis or parsing of queued information may then be performed on and/or using the snapshot queue 114 instead of the default queue 112. After the debugging process is finished, the controller 106 may analyze the snapshot queue 114 to determine what changes to the snapshot queue 114, if any, were made. The controller 106 may then make any corresponding changes or modifications to the default queue 112.

As previously described, queues having a linear configuration may have better readability than linked-list queues. As such, for situations that involve analyzing or parsing a queue, linear queues rather than linked-list queues may be preferred because linear queues may be analyzed more efficiently. However, linked-list queues provide better queue modification capabilities. By creating the snapshot queue 114 with a linear configuration for situations involving an analysis of queued information, while maintaining the default linked-list queue 112, a queue system with both the readability features of linear queues and the modification features of linked-list queues may be achieved.

In addition to hardware logic, the controller 106 may include or be a plurality of controllers, a processor, or a plurality of processors, configured to perform various types of processing, such as multi-processing, multi-tasking, parallel processing, remote processing, distributed processing, or the like, to perform its functions and operations. Also, in addition to using or executing the firmware 116, the controller 106 may be configure to execute program instructions that may be part of software, hardware, micro-code, firmware, or the like other than the firmware 116, in order to perform at least some of its function or operations.

The memory 108 may include one or more various types of memory structures or technologies of volatile memory, non-volatile memory, or combinations thereof, including but not limited to random access memory, read-only memory, programmable read-only memory, electrically programmable read-only memory, electrically erasable read-only memory, flash memory (e.g., NAND, NOR, or other flash memories), magnetic tape or disk, optical media, or other memory technologies. In addition, the memory 108, and or the storage system 102 in general, may be configured in accordance with any currently existing or later developed memory technologies or configurations, such as flash memory, Trusted Flash, Secure Digital, Hard Drive, or universal serial bus (USB), as non-limiting examples.

FIG. 1 shows the memory 108 as a single memory component of the storage system 102. Alternatively, the memory 108 may include multiple separate memory components, and the various portions of the memory 108, including the data storage 110, the default queue 112, the snapshot queue 114, and the firmware 116, may be implemented using the separate memory components of the memory 108. For example, the default queue 112, the snapshot queue 114, and the firmware 116, may be stored in portions of the memory 108 that may be considered internal to the controller 106, and the data storage 110 may be located on a different or external portion, in which communication between the controller 106 and the data storage 110 may be performed through an interface, such as a flash interface.

In addition or alternatively, the different portions of the memory may implemented using various types of volatile and/or non-volatile memory technologies. As an example, the data storage 110 may be implemented in flash memory, the queues 112, 114 may be implemented in random access memory (RAM), and the firmware 116 may be implemented in read-only memory (ROM). Various configurations or combinations of configurations are possible.

In some example configurations, the memory 108 may be a computer readable storage media, which may include a non-transitory computer readable storage media, having stored therein data representing instructions executable by the controller 106. The data may represent instructions of the firmware 116 and/or other instructions. The memory 108 may store the instructions for the controller 106. The functions, acts, methods, or tasks illustrated in the figures or described herein may be performed by the controller 106 executing the instructions stored in the memory 108.

In some example embodiments, the storage system 102 may be included in an electronic device or apparatus, such as a memory device or apparatus, that is configured to store or retain its memory even after power is removed. The host device 104 may be any of various types of electronic devices that may communicate with the storage system 102 to perform data transfer operations (e.g., reading and writing of data) with the storage system 102. As examples, the host device may include a computer or computing device, such as a personal computer (PC), a mobile device such as a cellular telephone, smart phone, tablet PC, camera, personal digital assistant (PDA), or an audio device using data storage, as examples.

In some configurations of the system 100, the storage system 102 and the host device 104 may considered separate devices. For example, the host device 104 may be a PC and the storage system 102 may be part of a storage device that may be connected to and disconnected from a communication port or interface of the PC. Alternatively, the system 102 and the host device 104 may be components or parts of the same or a single electronic device. For example, the host device 104 and the storage system 102 may components of a smart phone device. Various configurations or implementations of the storage system 102 and the mobile device 104 are possible.

Figure 9:
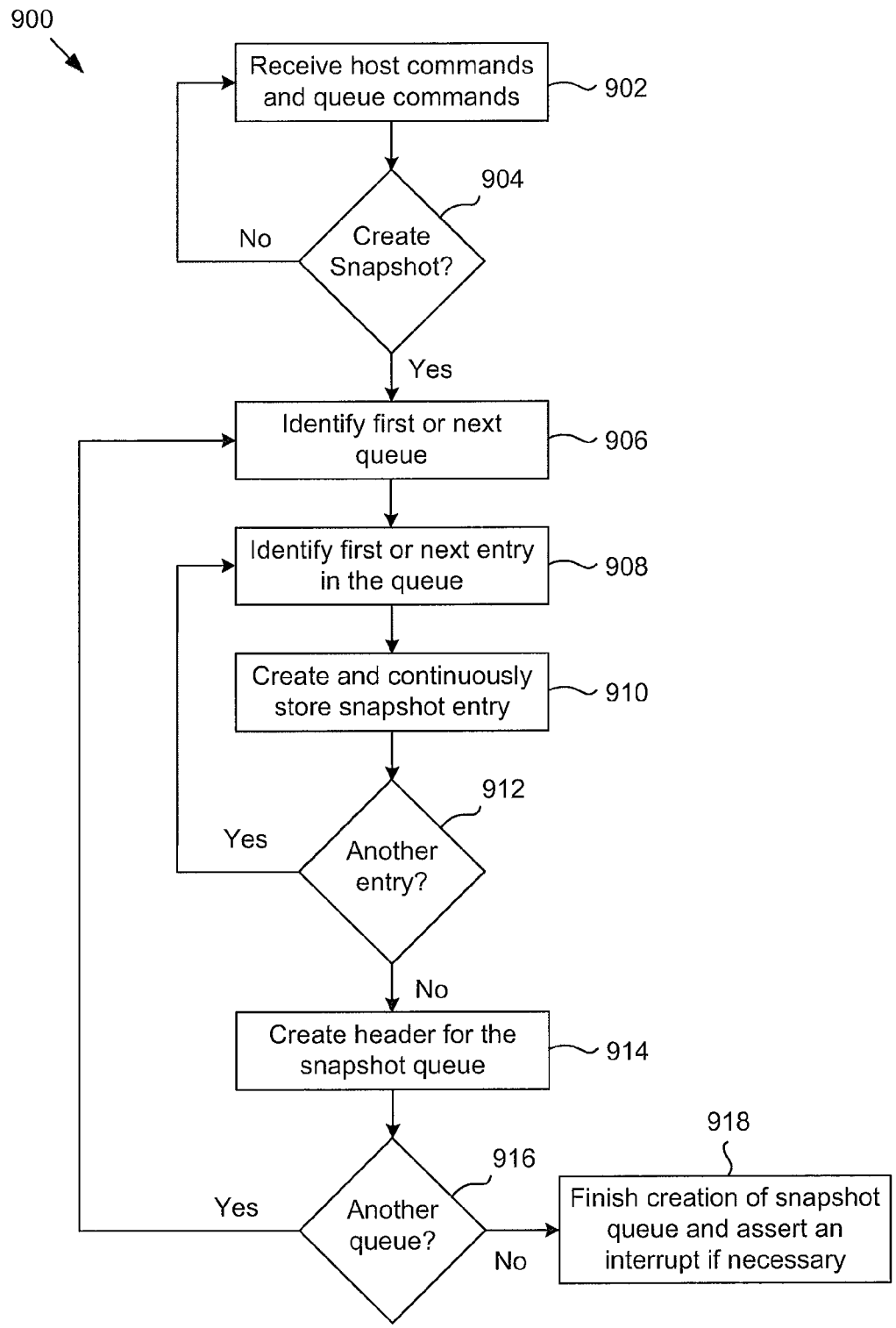
FIG. 9 is a flow diagram of an example method of creating a snapshot queue.

FIG. 9 shows a flow diagram of an example method 900 of creating a snapshot of a queue. At block 902, a controller of a storage system may receive host commands from a host, such as read commands, write commands, or admin commands as examples. Also, at block 902, the controller may store in a queue portion of memory, host commands or information from the host commands that it is unable to immediately execute. The queue may include one or more queue channels that may store the host commands or information from the host commands in a linked-list configuration.

At block 904, the controller may determine whether to create a snapshot of the queue. The controller may determine to create a snapshot in response to a triggering event, such as a request from firmware, detection of an internal hardware event, or detection of a debug process. If the controller has not determined not to create a snapshot—for example, the controller has not detected a triggering event—then the method 900 may proceed back to block 902, where the controller may continue to receive and/or store host commands in the queue.

Alternatively, if at block 904 the controller determines to create a snapshot of the queue, then the method 900 may proceed to block 906, where the controller may begin to create a snapshot of the queue. At block 906 the controller may identify a first queue channel of which to take a snapshot. At block 908, the controller may identify a first entry in the first queue channel. The controller may identify the first entry by identifying a head pointer including an address at which the first entry is stored in the queue channel.

At block 910, the controller may create an entry line of the snapshot queue corresponding to the first entry of the first queue channel. The entry line may include various fields, including a type field, a validity field, a tag field, and/or an information field including information relevant to execution of the host command. In addition, at block 910, the controller may store the first entry in a snapshot queue portion of the memory. At block 912, the controller may determine whether there is another entry in the queue channel of which to create a snapshot. If there is, then the method 900 may proceed back to block 908, where the controller may identify a next entry in the first queue channel and then create a next entry line in the snapshot queue corresponding to the next entry at block 910. Also at block 910, the controller may continuously store the entry lines in the snapshot queue in accordance with the linear queue configuration.

Alternatively, at block 912, if there are no more entries in the first queue channel of which to take a snapshot, then the method 900 may proceed to block 914, where the controller may create a header for the snapshot queue. As previously described, the header may include a unique queue ID, a queue size, and information that is general to the snapshot queue. In alternative method, the controller may create the header before creating any or all of the entries. At block 916, the controller may determine whether there is another queue channel of which to take a snapshot. If there is another queue channel, then the method 900 may proceed back to block 906, where the controller may identify a next queue channel of which to take a snapshot. Alternatively, if there are no more queue channels of which to take a snapshot, then at block 918, the method 900 of creating a snapshot queue may end. Additionally, at block 918, the controller may provide or assert a notification, such as a hardware interrupt, that the snapshot queue is created. The notification may inform or instruct an intervening entity, such as firmware and/or a debugger, of the creation of the snapshot queue in order for any intervention to be performed.

Figure 10:
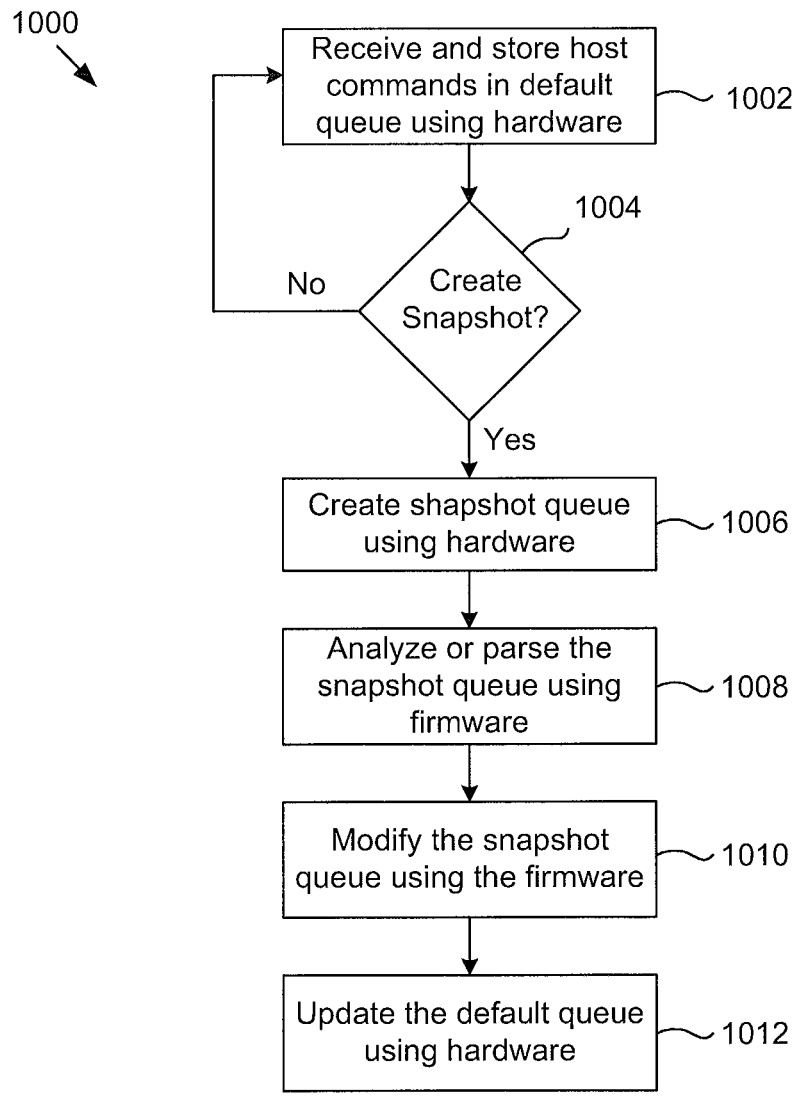
FIG. 10 is a flow diagram of an example method of managing a linked-list queue and a linear queue for a storage system.

FIG. 10 shows a flow diagram of an example method 1000 of managing a linked-list queue and a linear snapshot queue for a storage system. At block 1002, a controller of the storage system may receive host commands from a host, such as read commands, write commands, or admin commands, as examples. Also, at block 1002, the controller, using hardware such as hardware logic, may store host commands that it is unable to execute in the linked-list queue, which may be stored in memory. The queue may include one or more queue channels that may store the host commands or information from the host commands in a linked-list configuration.

At block 1004, the controller may determine whether to create a snapshot of the queue. The controller may determine to create a snapshot in response to a triggering event, which may be an event that causes the controller to use firmware to analyze queued information. If the controller has not determined to create a snapshot—for example, the controller has not detected the triggering event—then the method 1000 may proceed back to block 1002, where the controller may continue to receive and/or store host commands in the linked-list queue.

Alternatively, if at block 1004 the controller determines to create a snapshot of the linked-list queue, then the method 1000 may proceed to block 1006, where the controller, using hardware logic, may take a snapshot of the linked-list queue to create the linear snapshot queue. The controller may create one or more headers for one or more queue channels of the linear queue, as previously described. At block 1008, the controller, using firmware, may analyze or parse the linear snapshot queue. The analysis or parsing of the linear snapshot queue may include an analysis or parsing of information included in the header and/or entries of the linear snapshot queue. At block 1010, based on the analysis or parsing of the linear snapshot queue, the controller, using firmware, may determine to modify the linear snapshot queue. The modification may include a modification of one or more entries of the linear snapshot queue. For example, if the controller, using firmware, determines to remove an entry in the linear snapshot queue, the controller, using firmware, may change a validity field in the entry to indicate that the entry is invalid.

At block 1012, after the controller using the firmware is finished analyzing, parsing, and/or modifying the linear snapshot queue, the controller, using hardware logic, may update the linked-list queue based on any changes or modifications made to the linear snapshot queue. For example, if an entry in the linear snapshot queue has changed to being invalid, then the controller, using hardware logic, may remove that corresponding entry from the linked-list queue.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

We claim:

1. A storage system comprising:
a memory comprising a linked-list queue; and
a controller configured to:
receive host commands from a host device;
store at least one of the host commands or information from the at least one host command in the linked-list queue; and
take a snapshot of the linked-list queue to create a linear snapshot queue, the linear snapshot queue having a linear configuration.

2. The storage system of claim 1, wherein the controller is configured to take a snapshot of the linked-list queue in response to a triggering event.

3. The storage system of claim 2, wherein the triggering event comprises at least one of: an error scenario; an event that causes the controller to use firmware to perform queuing operations; an internal hardware event; or a debug event.

4. The storage system of claim 1, wherein the linear snapshot queue continuously stores one or more entries, each of the one or more entries corresponding to an entry stored in the linked-list queue.

5. The storage system of claim 4, wherein each of the one or more entries stored in the linear snapshot queue comprises a validity field indicating whether the entry is valid.

6. The storage system of claim 1, wherein the controller is configured to create a header for the linear snapshot queue, the header comprising at least one of a type field identifying the header as a header line, a queue identifier identifying the linear snapshot queue, a size of the linear snapshot queue, or information that is general to one or more entries in the snapshot queue.

7. The storage system of claim 1, wherein the linked-list queue comprises a plurality of linked-list channels, wherein the controller is configured to take a snapshot of each of the plurality of linked-list channels to create the linear snapshot queue, wherein the linear snapshot queue comprises a plurality of portions stored in the linear snapshot queue, each of the sections corresponding to one of the linked-list channels.

8. The storage system of claim 7, wherein the plurality of linked-list channels comprises a first linked-list channel and a second linked-list channel, wherein the linear snapshot queue comprises a first queue portion corresponding to the first linked-list channel and a second portion corresponding to the second linked-list channel, and wherein the controller is configured to continuously store a last entry of the first queue portion and a header of the second queue portion, the last entry of the first queue portion corresponding to a last entry in the first linked-list channel.

9. The storage system of claim 7, wherein the plurality of linked-list channels comprises a first linked-list channel and a second linked-list channel, wherein the linear snapshot queue comprises a first queue portion corresponding to the first linked-list queue channel and a second queue portion corresponding to the second linked-list queue channel, and wherein the first queue portion has one or more empty queue sections in between a last entry being stored in the first queue portion and a header of the second queue portion being stored in the second queue portion, such that the last entry of the first queue portion and the header of the second queue portion are stored discontinuously.

10. The storage system of claim 1, wherein the controller, using firmware, is configured to analyze the linear snapshot queue after the linear snapshot queue is created.

11. The storage system of claim 1, wherein the controller, using firmware, is configured to modify an entry in the linear snapshot queue.

12. The storage system of claim 11, wherein the controller, using hardware logic, is configured to update the linked-list queue based on the modification to the entry in the linear snapshot queue.

13. The storage system of claim 11, wherein the controller, using the firmware, is configured to modify the entry by a change of a validity field of the entry to indicate that the entry is invalid.

14. The storage system of claim 13, wherein the entry in the linear snapshot queue comprises a first entry, and wherein the controller, using hardware logic, is configured to remove a second entry in the linked-list queue, the second entry in the linked-list queue corresponding to the first entry in the linear snapshot queue, and wherein the removal of the second entry is based on the change of the validity field to the first entry.

15. The storage system of claim 1, wherein the controller, using firmware, is configured to store a new entry in the snapshot queue.

16. A method of creating a snapshot queue for a storage system, the method comprising:
   storing, with a controller in the storage system, one or more host commands in a default queue of a memory of the storage system, the default queue having a linked-list configuration;
   identifying, with the controller, a triggering event; and
   in response to identifying the triggering event, creating, with the controller, a snapshot queue in the memory, the snapshot queue being a snapshot of the default queue and having a linear configuration.

17. The method of claim 16, wherein creating the snapshot queue comprises:
   creating, with the controller, a first snapshot entry corresponding to the first default entry in the default queue;
   storing, with the controller, the first snapshot entry in the snapshot queue;
   identifying, with the controller, a second entry in the default queue using a pointer portion of the first default entry pointing to the second entry;
   creating, with the controller, a second snapshot entry corresponding to the second default entry; and
   continuously storing, with the controller, the second snapshot entry with the first snapshot entry in the snapshot queue.

18. The method of claim 16, wherein creating the snapshot queue comprises creating, with the controller, a header of the snapshot queue, the header comprising at least one of a type field identifying the header as a header line, a queue identifier identifying the linear snapshot queue, a size of the linear snapshot queue, or information that is general to one or more entries in the snapshot queue.

19. The method of claim 16, wherein the default queue comprises a plurality of default queue channels, and wherein creating the snapshot queue comprises:
   taking, with the controller, a snapshot of each of the default queue channels to create a plurality of sections of the snapshot queue, each of the sections corresponding to one of the default queue channels; and
   continuously storing, with the controller, a last entry of a previous section of the plurality of sections with a header of a next section of the plurality of sections.

20. The method of claim 16, wherein the default queue comprises a plurality of default queue channels, and wherein creating the snapshot queue comprises:
   taking, with the controller, a snapshot of each of the default queue channels to create a plurality of sections of the snapshot queue, each of the sections corresponding to one of the default queue channels; and
   discontinuously storing, with the controller, a last entry of a previous section of the plurality of sections with a header of a next section of the plurality of sections.

21. A method of managing queues stored in a memory of a storage system, the method comprising:
   storing, with a controller using hardware logic, information from one or more host commands in a linked-list queue;
   detecting, with the controller using the hardware logic, a triggering event causing the controller to use firmware to perform one or more queuing operations;
   in response to detecting the triggering event, creating, with the controller using the hardware logic, a linear snapshot queue, the linear snapshot queue being a snapshot of the default queue and having a linear configuration; and
   analyzing, with the controller using the firmware, the linear snapshot queue.

22. The method of claim 21, further comprising:
   changing, with the controller using the firmware, a validity field in a first entry in the linear snapshot queue to indicate that the entry is invalid; and
   removing, with the controller using hardware logic, a second entry in the linked-list queue, the second entry being removed in response to changing the validity field in the first entry to being invalid, the second entry in the linked-list queue corresponding to the first entry in the linear snapshot queue.

23. The method of claim 21, further comprising:
   adding, with the controller using the firmware, a new entry in the linear snapshot queue.

24. The method of claim 21, wherein analyzing the linear snapshot queue comprises analyzing, with the controller using the firmware, a header of the snapshot queue.

* * * * *